United States Patent Office 3,232,848
Patented Feb. 1, 1966

3,232,848
PURIFICATION OF ALCOHOLS
Philip C. Johnson, St. Albans, W. Va., assignor to Union Carbide Corporation, a corporation of New York
No Drawing. Filed Dec. 16, 1958, Ser. No. 780,683
18 Claims. (Cl. 203—35)

This application is a continuation-in-part of application Serial No. 734,853, filed May 13, 1958, now abandoned.

This invention relates to refining of synthetically produced alcohols, and more particularly to a method of purifying alcohol products containing undesirable contaminants for the purpose of improving color qualities of both the alcohol and its chemical derivatives.

Synthetically produced alcohols containing from four to twenty carbon atoms have been prepared by several well-known methods. Numerous alcohols, for example, have been prepared by the Oxo process, a synthesis in which carbonyl products obtained by the catalytic reaction between carbon monoxide, hydrogen and olefins, are hydrogenated to produce a mixture comprising various alcohols. Other known alcohol syntheses comprise the hydrogenation of the dehydrated aldol product from the condensation of aldehydes and the catalytic hydration of alkenes. Although alcohols produced by these processes are known to be suitable for the preparation of ester plasticizers, their use for this purpose has been handicapped to a large extent by the fact that the synthetically produced alcohols contain varying amounts of complex impurities and contaminants which render impossible the production of substantially colorless esters for use as plasticizers. As far as can be ascertained, the potential color inducing impurities present in synthetic alcohols are extremely complex in nature and are generally thought to be contaminating amounts of aldehydic and unsaturated compounds which are introduced into the alcohol by its method of manufacture. It is known, for example, that when Oxo aldehyde reaction mixtures are hydrogenated to produce alcohols by either a liquid phase or vapor phase hydrogenation, the acetals present in the Oxo reaction mixture essentially do not hydrogenate and some of the aldehydes polymerize. Moreover, the alcohol fraction is likely to be contaminated with high boiling esters, acetals, ethers etc., as well as decomposition products boiling within the range of the alcohol boiling range. When such alcohols are subjected to distillation measurable amounts of organic contaminants and color-forming impurities are distilled over with the alcohol fraction and are likewise present even when the alcohol is subjected to redistillation.

As an example of typical materials which contribute to the contamination and formation of color in synthetic alcohol products, several compounds were added singly to refined Oxo decanols, and the decanols were then subjected to an accelerated color test. This test has been found a reliable means of predicting the color quality of an end product derived from the sample. The test for color is carried out by heating 100 milliliters of the alcohol product with 8 milliliters of concentrated sulfuric and measuring the color by comparison with American Public Health Association color standards, as described in the American Society for Testing Materials, ASTM designation D1209–54. The color of the alcohol, as expressed in terms of APHA color units, is correlated with the color which would develop in an ester plasticizer made from the alcohol tested. A color developed in the test in the range of 40–50 on the APHA scale is the maximum considered acceptable. These color values are equivalent to the well-known Hazen ester color numbers except that the sulfuric acid test is more sensitive. Table I below illustrates the effect of several contaminants on the color of synthetic $C_{10}$ Oxo decanols containing a mixture of isomers which were obtained from the refined hydrogenated hydroformylation product of a $C_9$ propylene polymer.

Table I
EFFECT OF CONTAMINANTS ON COLOR OF DECANOLS

| Contaminant | Weight Percent | APHA Color |
|---|---|---|
| None | | 30 |
| Decylaldehyde | 0.145 | 230 |
| Do | 0.5 | >1000 |
| Didecylacetal of decylaldehyde | 0.226 | 165 |
| Decyl Formate | 1.0 | >60 |

Various methods have been suggested for refining synthetic alcohol products for the purpose of removing undesirable contaminants and color-forming impurities which would otherwise seriously limit the utility of such alcohols in their field of application. Known prior art methods include, for example, the treatment of crude alcohols with sodium bisulfite, metallic copper, nickel, mercury and alkali metal borohydrides. Although some of these methods provide a reduction in residual impurities contained in the alcohols, such methods have been limited by the expense involved in providing a sufficient yield of a purified product or by a general ineffectiveness in refining the alcohol to the extent required for its intended purpose. Since many of the synthetic alcohols find wide application as esterification alcohols in the preparation of plasticizers it is commercially important that the alcohols and their chemical derivatives be substantially free of organic contaminants and color-forming bodies.

It is an object of this invention, therefore, to provide a method for refining synthetic alcohol products containing undesirable contaminants and color-forming impurities so as to provide an alcohol of improved color quality. A further object is to provide a high quality synthetic alcohol which when esterified will produce a plasticizer ester having substantially no color. Another object is to provide a method for refining crude synthetic alcohols to yield alcohols having a color of less than 50 on the American Public Health Association (APHA) scale as determined by the sulfuric acid test previously described.

The above and other objects for refining synthetically produced alcohols in accordance with the invention are accomplished by the method which comprises subjecting a crude alcohol containing undesirable organic contaminants and color-forming impurities to a stripping distillation followed by a refining distillation of the stripped alcohol in the presence of a phosphorus-containing acid. The novel method for refining alcohols may be operated in a continuous or batchwise manner and the alcohols thus refined are highly useful in obtaining ester plasticizers, by reaction with aliphatic or aromatic acids, which exhibit substantially no color or odor in the final product.

The expression "phosphorus-containing acid," as employed throughout the specification and claims, refers to any Lewis acid which contains phosphorus. The definition of Lewis acids may be found in the publication "Valence and Structure of Atoms and Molecules," G. N. Lewis; Chemical Catalogue Co., New York, 1923, p. 141. The expression thus includes the ortho, pyro, meta and hypo forms of phosphoric and phosphorous acids. The preferred acids for purposes of the invention are orthophosphoric and orthophosphorous acids and their respective anhydrides, phosphorous pentoxide and phosphorous trioxide.

The alcohols amenable to the method of this invention include those alcohols which can be synthetically produced by any of the presently available methods, the term "synthetic" as employed herein referring to alcohols obtained by non-fermentation processes. Such alcohols are further characterized as being heat-stable during distillation, i.e., there is no substantial decomposition. The refining process is applicable for purifying synthetic alcohols obtained, for example, by the hydrogenation of the dehydrated aldol product from the condensation of aldehydes; the catalytic hydration of alkenes; the Guerbet process wherein alcohols are condensed by strong alkaline material; and, in general, by hydrogenation of carbonyl compounds. Typical alcohols which can be refined are the substantially water insoluble alcohols such as the branched-chain and straight-chain butanols, pentanols, hexanols, heptanols, octanols, nonanols, decanols, dodecanols, tridecanols, their homologues, and mixtures comprising two or more of such alcohols.

The process of the invention finds particular application for refining crude, saturated aliphatic alcohols containing from 4 to 20 carbons such as those obtained by the Oxo process. The Oxo process is described in U.S. Patent 2,327,066 and refers to the reaction of hydrogen, carbon monoxide and olefinic hydrocarbons in the presence of a hydroformylation catalyst to form aldehydes according to the following reaction:

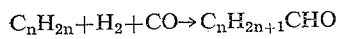

The aldehydes are then catalytically hydrogenated to form alcohols which comprise a mixture of isomers.

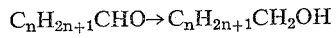

The Oxo process provides a valuable route for the synthesis of primary alcohols, particularly the $C_4$ to $C_{12}$ alcohols, which find commercial utility as esterification alcohols for preparing plasticizers. Typical Oxo alcohols which can be refined to a high purity and which have been limited in their field of application by the presence of organic contaminants and color-forming impurities include the mixed branch chain octanols, isooctanols, nonanols, decanols, isodecanols and the like.

In carrying out the method of the invention the crude synthetic alcohol is first subjected to a stripping distillation in order to remove from the alcohol a major portion of high boiling impurities and organic contaminants. The stripping distillaton is effected in a conventonal manner, either at atmospheric pressure or under reduced pressure, and can be carried out in any suitable apparatus, such as a still-kettle fitted with a distillation column equivalent to about 2 theoretical plates, for example, in which operation is carried out to provide a reflux ratio of about 1 to 3. In many instances, for example, when using the crude alcohol product from an Oxo synthesis, it has been found beneficial to effect a moderate amount of fractionation during the stripping operation by including additional trays in the stripping column. In this type operation a low boiling hydrocarbon fraction is removed in an overhead fraction and the alcohol-rich main cut removed as a side stream.

The temperature maintained during the stripping operation will vary, depending upon the pressure involved and the alcohol being distilled, and at the head of the distillation column the temperature should not substantially exceed the boiling point of the highest boiling isomer in the alcohol. For example, in a stripping distillation of Oxo decanols having a broad boiling range wherein the temperature at the head of the column is about 110° C. and the pressure is about 10 mm. mercury, the temperature of the high boiling bottoms material is above the upper limit of the boiling range of the alcohol. At the head of the column, however, the temperature is substantially about the boiling point of the highest boiling isomer contained in the alcohol, i.e., at a head temperature up to about 10° C. above the boiling range of the alcohols. When stripping an alcohol containing a single isomer, the temperature at the head of the column must at least be at the boiling point of the alcohol. The overhead vapor stream from the distillation comprises substantially all of the Oxo decanol plus the vaporized materials boiling below it. The bottoms product or residue in the kettle comprises the undecomposed impurities, representing about 5 percent of the total alcohol feed, and is either discarded or subsequently used in the preparation of chemical derivatives. Alternatively these bottoms materials can be recycled to the Oxo unit, for hydrolysis, hydrogenation, etc. and eventually returned to the refining stages of the instant process.

Following the stripping distillation of the crude alcohol, in which a major portion of the alcohol together with the light fractions are removed from the high boiling bottoms material, the stripped alcohol is subsequently subjected to a refining distillation in the presence of a phosphorus-containing acid. The amount of acid employed ranges from about 0.05 to 5.0%, by weight, based on the weight of alcohol, and is preferably about 0.5 to 2.0% by weight. The distillation is carried out in a conventional fractionating column, such as a regulation rectifying column, in which at least a portion of the materials more volatile than the alcohol are removed and condensed as an overhead stream or forefraction. The kettle temperature maintained in the refining distillation is preferably slightly above the upper limit of the boiling range of the alcohol at the operating pressure. This temperature range can be adjusted between about 100 to 300° C., and is preferably between about 120 to 180° C. The organic impurities and all of the materials boiling below the alcohol are removed in an overhead stream and the purified alcohol is removed as a side stream.

Apparently the refining distillation of the stripped alcohol in the presence of phosphorus-containing acid tends to alter the characteristics of the distillation so as to concentrate organic impurities and color-forming materials in the overhead stream which thus effects a cleaner separation and larger yield of the material boiling in the range of the desired alcohol. To this extent, therefore, the time of contact necessary for effecting substantially the complete removal of organic contaminants from the alcohols varies, depending upon the pressure and boiling point of the alcohol as well as on the amount of impurities present in the crude alcohol.

To insure a high quality alcohol substantially free of organic contaminants and color-forming impurities the stripped alcohol is advantageously refluxed in the presence of the phosphorus-containing acid at elevated temperatures, preferably under reduced pressure, for a period of time ranging from about one-half hour up to fifteen hours or more. The optimum time for refluxing the alcohol is related to the amount of unsaturated, aldehydic and organic impurities in the alcohol and a refluxing time of about three to twelve hours has been found effective. With a more contaminated alcohol, however, the reflux time may be appreciably lengthened.

By the above procedure it is possible to obtain a high quality alcohol product substantially free of undesirable contaminants and color-forming impurities. Preferably, the stripping distillation and the subsequent refining distillation in the presence of the phosphorous-containing acid are carried out in a continuous manner. This may be accomplished by continuously introducing the alcohol from the stripping distillation together with the required amount of acid into a fractionating column which contains at least eight theoretical plates. The column is maintained under a temperature and pressure sufficient to obtain a good rate of reflux, preferably under reduced pressure with a reflux ratio of about 3 to 1, while the phosphorus-containing acid-alcohol mixture is continuously introduced at a rate sufficient to maintain a residence time of from about one-half hour to fifteen hours. In this manner, the alcohol and acid are simultaneously refluxed and distilled in one operation. A portion of the overhead stream is condensed and returned to the column as reflux while the remaining portion is recycled to the unit from which the alcohol was synthesized. Introduction of the alcohol to the refining column and product removal is adjusted accordingly to maintain a conventional balance typical of a continuous distillation.

The alcohols also may be refined in a batchwise manner. In the batch operation, however, treatment of the stripped alcohol with the phosphorus-containing acid and the refining distillation are carried out in a sequential operation. This is accomplished by first subjecting the stripped alcohol to treatment with the acid under total reflux for the required period of time and then neutralizing the alcohol with an aqueous solution of caustic. Following the caustic treatment, the alcohol phase is separated from the aqueous phase and is washed at least once with water, using a volume ratio of one part water for each 0.5 to 5.0 parts of alcohol, to remove soluble salts. The washed alcohol is then subjected to the refining distillation, as above described, to recover a purified alcohol product.

The caustic treatment serves to prevent cracking and dehydration of the alcohol which would otherwise occur during the refining operation due to the increase in concentration of phosphoric acid as distillation proceeds. The caustic material employed is an aqueous solution of an alkali metal hydroxide, such as sodium or potassium hydroxide, which is used in a concentration ranging from about 5 to 35%, preferably 5 to 15%, by weight, in a volume ratio of one part caustic solution for every 0.5 part to 5.0 parts of alcohol. The alcohol may be contacted with the caustic at room temperature or higher and under reduced or atmospheric pressure.

Although the process of the invention contemplates at least one initial stripping distillation of the crude synthetic alcohol prior to its subsequent distillation in the presence of the phosphorus-containing acid, the alcohol may, if desired, be subjected to redistillation. Both the stripping distillation and refining distillation can be effected at atmospheric, subatmospheric, or superatmospheric pressure and in many instances superatmospheric pressure may be advantageously employed in the initial stripping distillation to obtain higher temperatures and increased cracking of the bottoms material which thereby releases more of the combined alcohol. The described method of refining alcohols is applicable to any synthetic alcohol containing undesirable contaminants and especially those which have a sulfuric acid test color on the APHA color scale of over 75.

The following examples serve to illustrate the method of the invention and are not to be considered as limiting.

Examples 1 and 2 below illustrate that a single or double distillation of crude alcohols containing undesirable contaminants and color-forming impurities fails to yield an alcohol sufficiently free of impurities to be used as plasticizer material. The test employed for determining whether or not the alcohol is sufficiently free of impurities is the sulfuric acid color test previously described. A color developed in the test in the range of 40 to 50 on the APHA scale is the maximum considered acceptable. The test method was shown to correlate well with the color which would develop in the plasticizer made from the alcohol under examination.

EXAMPLE 1

Oxo decanols having a sulfuric acid test color of >1000 APHA units were obtained by the hydrogenation of the hydroformylation product of nonenes. The alcohols were distilled by the use of a 40-tray Oldershaw column. The pressure was reduced to about 30 mm. of mercury so that the maximum vapor temperature of the alcohols was 150° C. There was obtained a recovery of decanols of 55 weight percent having a sulfuric acid test color of 235 APHA units.

EXAMPLE 2

The alcohols, as described in Example 1, were first stripped of high boiling residue by the use of a column having two theoretical plates, and to a temperature in the head of the column of 120° C. and a pressure of 10 mm. of mercury. The residues, i.e., material boiling above 120° C. at 10 mm. of mercury, representing about 5 percent, were discarded. The material boiling up to 120° C., 95 percent of charge, was transferred to a 1-liter kettle equipped with a 40-tray Oldershaw column, equivalent to 10 theoretical plates. The pressure was reduced to 30 mm. of mercury. Distillation was begun, and fractions representing 10 percent by weight of the charge were taken at a 3 to 1 reflux ratio and a boil-up rate of 400 cc. per hour. These fractions were then tested by the sulfuric acid color test. At a maximum kettle temperature of 165° C., 92 percent of the charge had been taken. By this technique, there was provided a recovery of 60 weight percent of alcohol having an average sulfuric acid color of 100 APHA units.

Examples 3 to 7 illustrate a batch refining of alcohols in accordance with the method of the invention wherein crude alcohols are stripped from high boiling materials, refluxed with a phosphorus-containing acid, treated with caustic, washed and thereafter refined. Example 4 illustrates the use of a high concentration of acid.

EXAMPLE 3

Decanols were stripped of high boiling residues as described in Example 1. The stripped alcohols had a sulfuric acid color of 800 APHA units. These alcohols were charged to a 1-liter kettle, and there was added 1 percent of 85% by weight orthophosphoric acid. The material was refluxed for 6 hours at a kettle temperature of 150° C., and the pressure was reduced to give good reflux (to about 50 mm. of mercury). The alcohol was cooled and neutralized with ⅙ volume (stoichiometric equivalent) of 5 percent aqueous sodium hydroxide, and washed twice with ½ volume of cold water. The alcohols were distilled as described in Example 2. There was provided a recovery of 78 weight percent of alcohol having sulfuric acid color of 45 APHA units.

EXAMPLE 4

The decanols, as described in Example 3, after stripping, were treated with 2 percent of 85% by weight phosphoric acid, based on the decanol charge, and treated in the same manner as Example 3. There was obtained a recovery of 70 weight percent of the alcohol having a sulfuric acid test color of 41 APHA units.

EXAMPLE 5

Example 3 was repeated using decanols having a sulfuric acid test color of 125 APHA units. There was provided a recovery of 85 weight percent of alcohol having a sulfuric acid test color of 14 APHA units.

EXAMPLE 6

Isodecaldehyde in the amount of 0.5 weight percent was added to refined iso-decanols which had a sulfuric acid test color of 18 APHA units. This mixture, which had a sulfuric acid test color of >1000, was batch distilled to obtain a recovery of 59 percent of refined alcohol having a sulfuric acid test color of 150 APHA units. To 2000 grams of this aldehyde-containing alcohol there was added 20 grams of phosphorus pentoxide. The mixture was heated for six hours at a reduced pressure (approximately 200 mm. of Hg) which allowed the kettle temperature to be maintained at 180° C. under reflux conditions. At the end of the treating period the mixture was cooled. The contained acid was neutralized with the stoichiometric equivalent of five percent aqueous sodium hydroxide and washed with one-half volume of cold water. The washed, treated alcohol was batch distilled through a 30-tray Oldershaw column at a pressure of 30 mm. of Hg and at a reflux ratio of 3 to 1. There was obtained a recovery of 72 percent refined alcohol having a sulfuric acid test color of 27 APHA units.

EXAMPLE 7

The aldehyde-containing alcohols were treated in the same way as in Example 6 except that 2 weight percent of a 50 percent aqueous solution of ortho-phosphorous acid was used instead of the phosphorus pentoxide. After refluxing, neutralizing, and distilling, there was obtained a 73 percent recovery of refined alcohol having a sulfuric acid test color of 30.

Example 8 illustrates the method of the invention as applied to a continuous operation wherein the crude alcohols are stripped and subjected to a continuous distillation in the presence of a phosphorus-containing acid. Example 9 illustrates a continuous operation carried out in the absence of a phosphorus-containing acid.

EXAMPLE 8

A stripping distillation of crude Oxo decanols yielded an over-head fraction of 16 weight percent, a mid-fraction of 78 weight percent, and a residue of 6 weight percent. The mid-fraction was treated with phosphoric acid and distilled according to the following procedure.

The equipment for the continuous phosphoric acid treatment consisted of a 2-liter flask fitted with a graduated dropping funnel and two Oldershaw columns, connected in series by means of a side stream take-off adapter, the top column having 20 trays and the lower having 10 trays. The upper column (20 tray column) was fitted with an automatic liquid dividing head and receivers connected to a vacuum system. A portion of the stripped alcohols was charged to the kettle and orthophosphoric acid added to make a total of 1 percent based on the total charge. Heat was applied to the kettle and the pressure adjusted to allow the decanols to reflux in the column at a kettle temperature at 150° C. The remaining portion of the stripped alcohols was fed to the kettle at a rate of 0.27 percent, based on total alcohol in the kettle, per minute, which allowed for a residence time of 6 hours. As alcohol feed was started, the sidestream and overhead flows were begun, the rates being such that the total material out equalled that which was fed for any given period of time. After the amount of refined decanol taken off equalled the amount originally in the kettle, make-up acid equal to 0.15 percent, by weight, of the alcohol to be added was added to the alcohol feed. The continuous operation was carried out for a total of 12 hours.

There was obtained a recovery of 70 weight percent of decanol having a sulfuric acid test color of 30 APHA units. This is equivalent to a total recovery of 54.6 percent of the crude decanol.

The overhead material (30 percent) from the continuous distillation was returned to the first stage distillation for another pass through the system.

EXAMPLE 9

Using the same crude decanols of Example 8, the process described in Example 8 was repeated except that no acid was added during the second-stage distillation. By this treatment, there was obtained a recovery of 70 weight percent of material (charged to the second-stage) of alcohol having a sulfuric acid test color of 400 APHA units. This is equivalent to a total recovery of 54.6 percent of the crude decanol.

In order to illustrate that the process of this invention is amenable to other crude synthetic alcohols, 2-ethylhexanol obtained by the vapor-phase hydrogenation of the dehydration product from the condensation of butyraldehyde was first subjected to a simple distillation and then refined in accordance with the invention. The results shown below in Example 10 illustrate that a simple distillation fails to provide an alcohol product sufficiently free of color-forming impurities.

EXAMPLE 10

Crude 2-ethylhexanol, obtained as above described, was distilled using a column having 40 trays. The temperature of the kettle was 165° C. and the pressure was 100 mm. of mercury. There was obtained a recovery of 54 weight percent of alcohol having sulfuric acid test color of 95 APHA units.

EXAMPLE 11

Crude 2-ethylhexanol prepared as described in Example 10 was subjected to the process of this invention as carried out in Example 8. The alcohol was stripped of high boiling residues using a 2 plate column. The alcohol was distilled at a head temperature of 120° C. at 50 mm. of mercury pressure. A portion of the stripped alcohols was then added to a 2-liter kettle, containing 1 percent of 85% by weight orthophosphoric acid. The alcohols were then distilled continuously, as described in Example 8, for 6 hours at 150° C. and a pressure of 200 mm. of mercury. There was provided a recovery of 70 percent alcohol having a sulfuric acid test color of 30 APHA units.

The APHA color test based on the sulfuric acid test previously described is known to correlate with the color which would develop in a plasticizer made from the alcohol being tested. Example 12 illustrates this correlation.

EXAMPLE 12

Two samples of decanol, one having a sulfuric acid test color of 40 APHA units and the other 500 APHA units were esterified with adipic acid to prepare didecyl adipate, commonly known as Flexol Plasticizer 10–A. The ester was prepared by reacting 10 percent molar excess of the stoichiometric quantity of the alcohol with adipic acid in the presence of 0.05 percent by weight of sulfuric acid. After heating to 180° C., the pressure was reduced to obtain good reflux and water of reaction was removed as a separate phase. The mixture was maintained under these conditions for about three hours. After the reaction was complete, the alcohol was removed by distilling at 180° C. under reduced pressure. In order to remove all of the alcohol, steam was sparged through the mixture which was maintained at a temperature of about 100° C. and a pressure of about 30 mm. of mercury. The sparging was continued until there was essentially no alcohol present in the ester. The color of this ester was then compared directly with APHA color standards.

The ester made from the alcohol intially having a sulfuric acid test color of 40 APHA units was reduced to 25 APHA units while the color of the ester from the alcohol initially having a sulfuric acid color of 500 APHA units was reduced to 70 APHA units. The latter alcohol is too highly colored for many applications for which plasticizers are required.

Table II below illustrates the effect of refining treatments on the quality of crude alcohols as described in Examples 1 to 11. The crude alcohols in Examples 1 to 7 were obtained by the liquid phase hydrogenation of Oxo decylaldehydes in the presence of about three percent by weight Raney nickel catalyst at a temperature of about 180° C. under a pressure of 150 pounds per square inch gauge. The alcohols of Examples 8 and 9 were obtained by the vapor phase hydrogenation of Oxo decanols carried out at temperatures between 135 and 140° C. under a pressure of about 75 pounds per square inch gauge.

*Table II*

EFFECT OF REFINING TREATMENT ON QUALITY OF CRUDE ALCOHOLS

| Example | Source of Alcohol | Method of Refining | Type of Operation | Recovery, Percent | APHA Color [1] Before Treatment | APHA Color [1] After Treatment |
|---|---|---|---|---|---|---|
| 1 | Oxo | Single distillation | Batch | 55 | 1,000 | 235 |
| 2 | Oxo | Double distillation | do | 60 | 1,000 | 100 |
| 3 | Oxo | Strip, reflux with 1 percent H$_3$PO$_4$ neutralized acid, water wash, distill. | do | 78 | 1,000 | 45 |
| 4 | Oxo | Strip, reflux with 2 percent H$_3$PO$_4$ neutralize acid, water wash, distill. | do | 70 | 1,000 | 41 |
| 5 | Oxo | Same as 3 | do | 85 | 125 | 14 |
| 6 | Oxo | Same as 3 (P$_2$O$_5$ used) | do | 72 | 1,000 | 27 |
| 7 | Oxo | Same as 3 (H$_3$PO$_3$ used) | do | 73 | 1,000 | 30 |
| 8 | Oxo | Strip, distill in presence of 1 percent H$_3$PO$_4$ | Continuous | 54 | 1,000 | 30 |
| 9 | Oxo | Strip, distill in absence of H$_3$PO$_4$ | do | 54 | 1,000 | 400 |
| 10 | Aldol condensation | Single distillation | Batch | 54 |  | 95 |
| 11 | do | Same as 8 | Continuous | 70 |  | 30 |

[1] American Public Health Assoc. Color Standards; ASTM D 1209-54.

What is claimed is:

1. A method for refining synthetically produced water-insoluble, heat-stable alcohols which comprises introducing a crude synthetic alcohol containing undesirable contaminants and color-forming impurities in a first distillation zone, maintaining in the head of said zone a temperature about the boiling point of the alcohol, removing from said zone an overhead vapor stream relatively free of high-boiling bottoms material, introducing said overhead stream to a second distillation zone maintained at a temperature about the boiling range of the alcohol, refluxing and distilling said overhead stream in the presence of a phosphorus-containing Lewis acid, removing volatile materials boiling below the alcohol product as an overhead stream, and thereafter recovering an alcohol product substantially free of undesirable contaminants and color-forming impurities.

2. The method of claim 1 wherein the amount of acid employed is about 0.05 to 5.0%, based on the weight of the alcohol.

3. The method of claim 2 wherein the acid is a member selected from the group consisting of phosphoric and phosphorous acids and the anhydrides thereof.

4. The method of claim 3 wherein the overhead stream in the presence of said acid is refluxed for a period of time ranging from about one-half hour to 15 hours.

5. A continuous method for refining crude, synthetically produced heat-stable, saturated aliphatic alcohols produced by the oxonation of olefins with carbon monoxide and hydrogen, having about 4 to 20 carbon atoms and containing undesirable contaminants and color-forming impurities, which method comprises continuously introducing said alcohol to a first distillation zone, maintaining in the head of said zone a temperature about the boiling point of the alcohol, removing from said zone an overhead vapor stream relatively free of high-boiling bottoms material, introducing said overhead stream to a second distillation zone maintained at a temperature about the boiling range of the alcohol, refluxing and distilling said overhead stream in the presence of a phosphorus-containing acid selected from the group consisting of phosphoric and phosphorous acids and the anhydrides thereof, removing volatile materials boiling below the alcohol product as an overhead stream, and continuously recovering from said second zone an alcohol product substantially free of undesirable contaminants and color-forming impurities.

6. The method of claim 5 wherein the amount of said acid employed is about 0.05 to 5.0%, based on the weight of the alcohol.

7. The method of claim 6 wherein the acid is phosphoric acid.

8. The method of claim 6 wherein the acid is phosphorous acid.

9. The method of claim 6 wherein the acid is phosphorus pentoxide.

10. The method of claim 6 wherein the overhead stream in the presence of said acid is refluxed and distilled for a period of time ranging from about one-half hour to 15 hours.

11. The method of claim 6 wherein the alcohol contains about 4 to 12 carbon atoms.

12. The method of claim 11 wherein the alcohol is Oxo decanol.

13. The method of claim 1 wherein the alcohol is 2-ethylhexanol.

14. A batch method for refining crude, synthetically produced heat-stable, saturated aliphatic alcohols produced by the oxonation of olefins with carbon monoxide and hydrogen, having about 4 to 20 carbon atoms and containing undesirable contaminants and color-forming impurities, which method comprises introducing said alcohol to a first distillation zone, maintaining in the head of said zone a temperature about the boiling point of the alcohol, removing from said zone an overhead vapor stream relatively free of high boiling bottoms material, refluxing said overhead stream in the presence of a phosphorus-containing Lewis acid at a temperature about the boiling range of the alcohol, contacting said refluxed stream with an aqueous solution of an alkali metal hydroxide of 5 to 35% by weight concentration to form an alcohol phase and an aqueous phase, separating said alcohol phase from the aqueous phase, water-washing the alcohol phase, introducing said water-washed alcohol to a fractional distillation zone maintained at a temperature about the boiling range of the alcohol, distilling said alcohol, removing volatile materials boiling below the alcohol product as an overhead product, and recovering an alcohol product substantially free of undesirable contaminants and color-forming impurities.

15. The method of claim 14 wherein the overhead stream is refluxed for a period of time ranging from about one-half hour to 15 hours.

16. The method of claim 15 wherein the acid is phosphoric acid.

17. The method of claim 15 wherein the acid is phosphorous acid.

18. The method of claim 15 wherein the acid is phosphorus pentoxide.

References Cited by the Examiner

UNITED STATES PATENTS

| | | | |
|---|---|---|---|
| 736,098 | 8/1903 | Highton | 260—643 |
| 2,569,671 | 10/1951 | Hughes | 260—643 |
| 2,576,030 | 11/1951 | Morrell et al. | 202—57 |
| 2,696,508 | 12/1954 | Wilson | 260—643 |
| 2,726,199 | 12/1955 | Biribauer | 202—57 |
| 2,757,203 | 7/1956 | Hale | 260—638 |
| 2,837,468 | 6/1958 | Ruhf | 260—637 |

ROBERT F. BURNETT, *Primary Examiner.*

GEORGE D. MITCHELL, NORMAN YUDKOFF, RICHARD D. NEVIUS, CHARLES B. PARKER,
*Examiners.*